United States Patent [19]

Landers et al.

[11] 4,035,294

[45] July 12, 1977

[54] PRESSURE DIFFERENTIAL FILTERING DEVICE AND METHOD

[75] Inventors: Donald R. Landers, Ridgefield, Conn.; Walter Greenfield, Ardsley; Peter D. Tukey, Tarrytown, both of N.Y.

[73] Assignee: Denver Chemical Manufacturing Company, Stamford, Conn.

[21] Appl. No.: 580,175

[22] Filed: May 23, 1975

[51] Int. Cl.² .................................. B01D 33/00
[52] U.S. Cl. ........................... 210/77; 210/117; 210/359; 210/DIG. 23; 210/DIG. 24
[58] Field of Search ........... 210/77, 117, 136, 359, 210/416 R, 446, 516, DIG. 23, DIG. 24

[56] References Cited

U.S. PATENT DOCUMENTS

| 3,441,205 | 4/1969 | Young, Jr. | 210/DIG. 23 |
|---|---|---|---|
| 3,706,305 | 12/1972 | Berger et al. | 210/DIG. 24 |
| 3,750,645 | 8/1973 | Bennett et al. | 210/DIG. 24 |
| 3,799,342 | 3/1974 | Greenspan | 210/83 X |
| 3,814,079 | 6/1974 | LeRoy, Sr. | 210/DIG. 23 |
| 3,832,141 | 8/1974 | Haldopoulos | 210/359 X |
| 3,846,077 | 11/1974 | Ohringer | 210/359 X |
| 3,932,277 | 1/1976 | McDermott et al. | 210/77 |
| 3,955,423 | 5/1976 | Ohringer | 210/359 X |

*Primary Examiner*—Bernard Nozick
*Assistant Examiner*—William A. Cuchlinski, Jr.
*Attorney, Agent, or Firm*—Gordon W. Hueschen

[57] ABSTRACT

A pressure differential sampling and filtering device and method comprising a tube adapted to hold a liquid to be filtered and an inner tube having a filter head adapted to be inserted into the tube and force the liquid up through the filter head into the inner tube is characterized by the employment of a filter head and by the inner tube being associated with and separable from a closed-end portion which then serves as a test tube when the assembly is inverted and the filter head separated therefrom.

5 Claims, 8 Drawing Figures

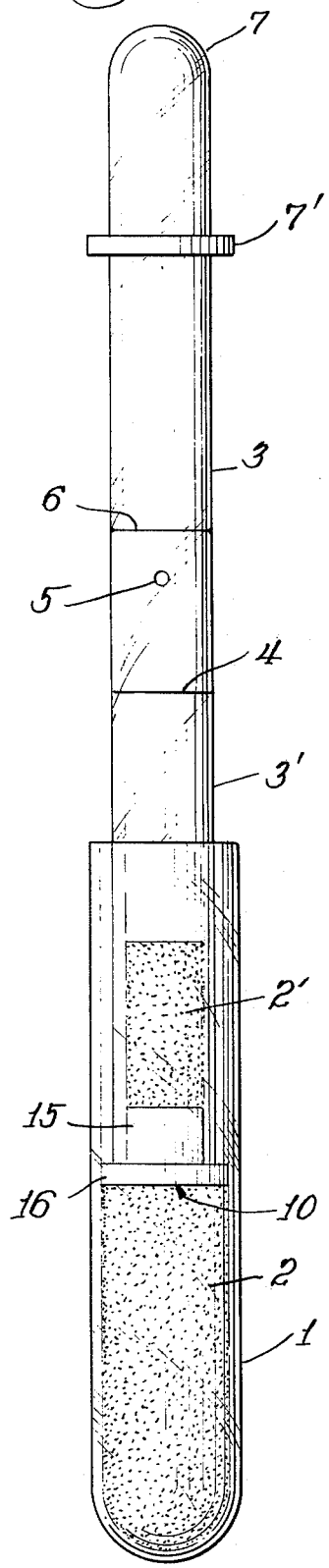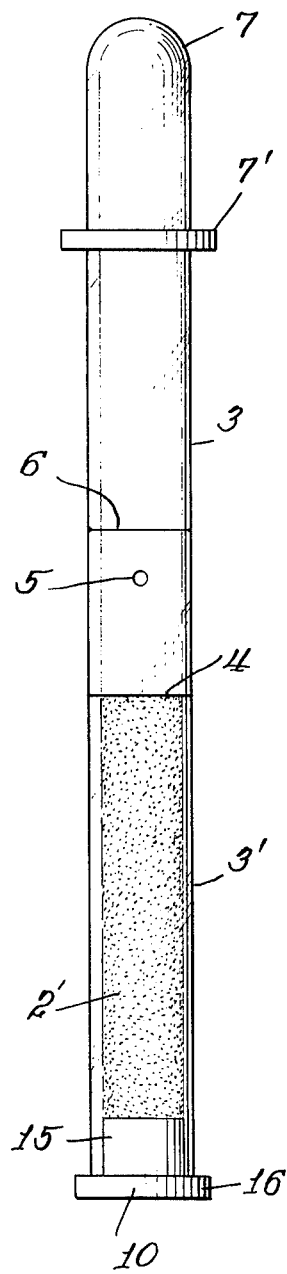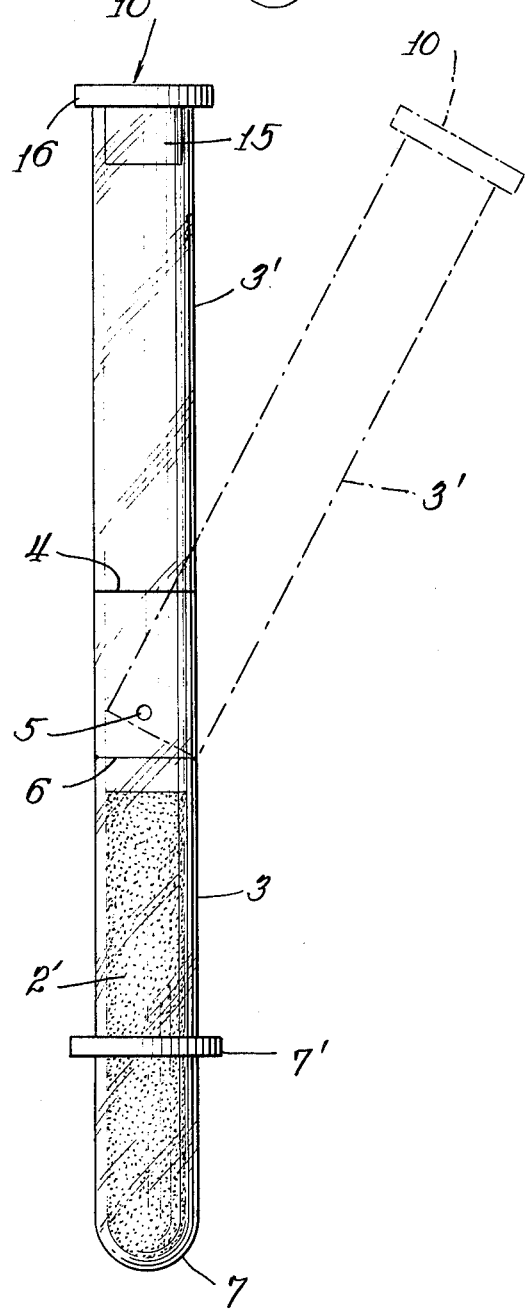

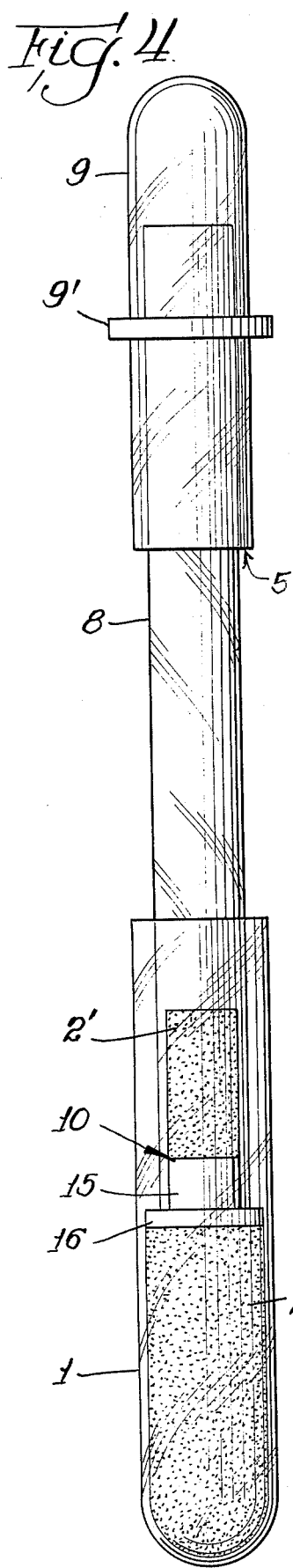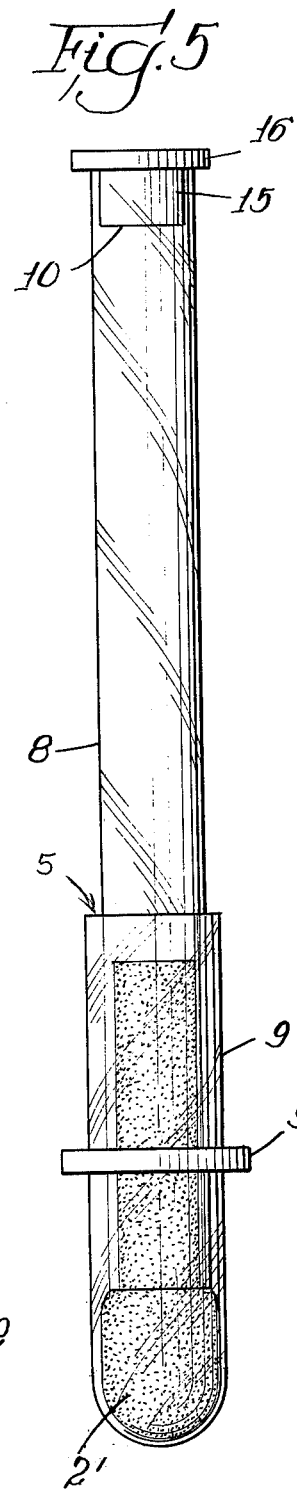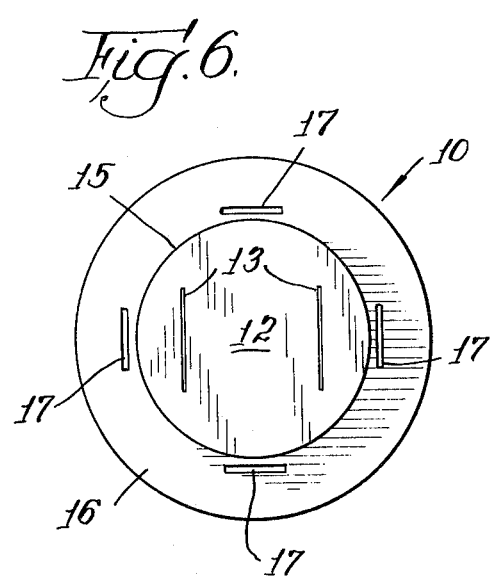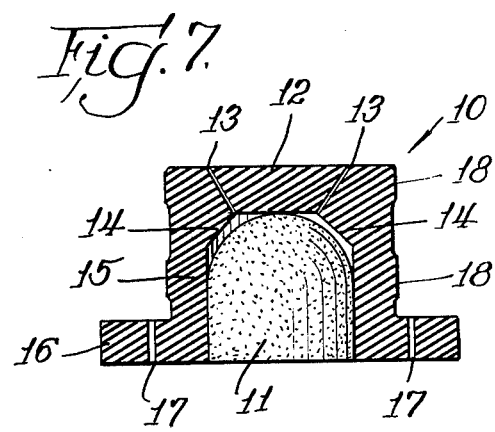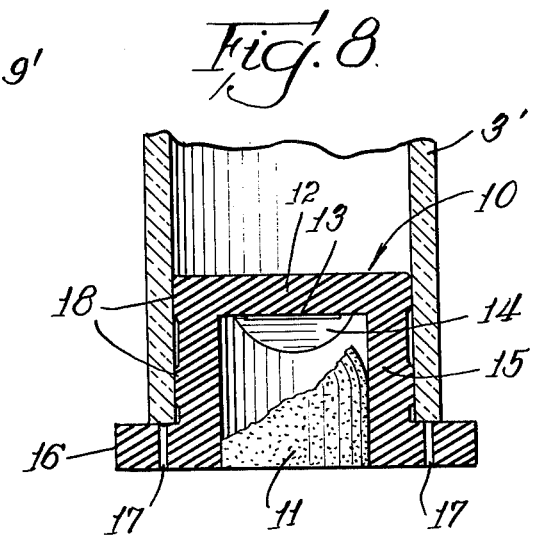

PRESSURE DIFFERENTIAL FILTERING DEVICE AND METHOD

BACKGROUND OF THE INVENTION

The invention relates to improvements in method and apparatus for the filteration and handling of liquid materials to provide a clear sample for analysis or other testing. Particularly, it is directed to pressure differential filtering devices and methods characterized by an outer tube adapted to hold the liquid to be filtered and an inner tube having a filter head adapted to be inserted into the tube and to engender a pressure on the liquid therein to force it up through the filter head into the inner tube. In the apparatus and methods heretofore available, the inner tube containing the filtered liquid is withdrawn and the filtered liquid poured into a suitable test tube and transferred therein to a suitable testing apparatus. Methods and apparatus of this general kind are found in U.S. Pat. Nos. 3,661,265; 3,693,804; and 3,799,342.

OBJECTS OF THE INVENTION

It is an object of the invention to provide new and improved apparatus and method of the class described. It is a still further object of the invention to provide a better method and apparatus for transfering filtered liquid to the testing apparatus. These and other objects will appear as the description proceeds.

SUMMARY OF THE INVENTION

The invention is directed to a method and apparatus for obtaining a filtered sample of liquid and transfering it to testing apparatus and is particularly directed to such an apparatus and method in which there is provided an outer tube adapted to hold the liquid to be filtered and an inner tube having a pressure differential filter head at the end thereof adapted to be inserted into the outer tube in contact with the liquid to be filtered and to engender a pressure thereon which causes the liquid to pass through the filter head into the inner tube, which is further characterized by the inner tube having a filter-head portion adapted to receive the liquid which passes through the filter into the inner tube and a closed-end portion at the opposite end of the tube from the filter-head portion, an air vent for exiting air from the inner tube located between the filter head and the closed end above the normal liquid level in the inner tube, and the closed-end portion being separable from the filter-head portion. When the inner tube containing filtered liquid is withdrawn and inverted, the filtered liquid flows into the closed-end portion. The filter-head portion can then be separated therefrom leaving the closed-end portion to serve as a test tube for the further processing of the filtered liquid. The closed-end portion may be provided with an annular collar intermediate its length to serve as a support when the tube containing the liquid is transferred to suitable testing apparatus.

In one form of the invention, the closed-end portion is an integral part and a continuation of the filter-head portion, and at the junction of the two portions is a score line or frangible seam, so that when the assembly is inverted, the filter-head portion may be broken off, leaving the tube-end portion containing the filtered liquid for use in further processing. At a point below the juncture of the two portions is a vent means consisting simply of an aperture or bore into the filter-head portion above the normal liquid level therein. Thus, when the filter-tube assembly is pushed into the outer tube containing the liquid to be filtered, the liquid is forced up through the filter head into the filter-head portion of the tube and the air which otherwise would prevent the liquid from filling the tube is vented through the vent. The filter-tube assembly is then withdrawn, inverted, and the filter-head portion broken off, leaving the tube-end portion and its filtered liquid contents to be passed on to further processing.

In accordance with another embodiment of the invention, the closed-end portion is telescoped over the filter-head portion and the space between the two telescoped portions serves as an air vent for exiting air from the filter-head portion. In operation, the filter-tube assembly is pushed in to force a desired quantity of filtered liquid into the filter-head portion, withdrawn, inverted, thereby transferring the filtered liquid to the closed-end portion, and the filter-head portion then withdrawn and discarded, and the closed-end portion containing the filtered liquid passed on for further processing. The closed-end portion and the filter-head portion in the telescoped assembly may be fastened together by a frangible seal provided it does not completely seal off and occlude the air vent function of the space between the telescoped portions.

To facilitate these operations, an improved filter head is preferably used, comprising a cylindrical plug adapted to be inserted into the filter tube having an annular flange adapted to function as a piston in the outer tube. The cylindrical plug has a cylindrical bore extending from the flange up to near the top of the cylindrical plug, which bore is adapted to receive suitable filter material. The plug has at least one slit perforation in its top communicating with the bore near the periphery thereof which allows the passage of the filtered liquid into the inner tube but does not allow it to pass back when the tube is withdrawn. The slit perforation forms a chord with the cylindrical bore and the cylindrical bore has an angular portion sloping outwardly from the periphery to the slit chord. The annular flange has at least one slot perforation from the bottom of the flange to the top thereof with the top of the slot being covered by the bottom of the inner tube, whereby when the flange is pushed up against the tube bottom, as when the inner tube is inserted into the outer tube and pushed into it against the liquid therein, the slot perforation is sealed off by the bottom of the inner tube, and when the flange is pulled away from the bottom walls of the inner tube, as when the inner tube is being withdrawn, the slot perforation is uncovered and thus opened for passage of air therethrough into the outer tube as the inner tube is withdrawn.

BRIEF DESCRIPTION OF THE DRAWINGS

In the drawings:

FIG. 1 is a side elevation of one form of the invention.

FIG. 2 is a side elevation of the filter-tube assembly.

FIG. 3 is a side elevation of the inverted filter-tube assembly with the filter-head portion being broken away as shown by the broken lines.

FIG. 4 is a side elevation of a modified form of the invention.

FIG. 5 is a side elevation of the filter tube assembly of FIG. 4 in inverted position.

FIG. 6 is a plan view of the filter plug.

FIG. 7 is a cross section of the filter plug showing the filter material in place.

FIG. 8 is a detail sectional view with parts broken away showing the construction of the filter head.

DETAILED DESCRIPTION OF THE INVENTION

Referring now more particularly to FIG. 1, 1 is the outer tube adapted to hold the liquid 2 to be filtered. 3–3' is the inner tube, or filter tube, having a closed end 7 and a filter head 10. The closed-end portion 3 is separated from and separable from the filter-head portion 3' by a score line 6 forming a frangible seam. Line 4 is a fill line to indicate when the desired quantity of filtered liquid 2' has been filtered into the filter-head portion 3'.

The filter head consists of a cylindrical plug 10 having an annular flange 16 that serves as a piston in the outer tube 1. When the filter tube 3–3' is pushed into the outer tube, the filter head functions as a piston to force out first, all of the air into the filter tube 3–3' and, second, as the filter tube is further pushed into the outer tube, to force the liquid through the filter head into the filter-head portion 3'. A vent 5 is provided in the filter tube located between the frangible seam or score line 6 and the normal liquid level represented by the fill line 4. This allows air to escape as air and liquid is forced into the filter tube through the filter head 10.

The filter tube assembly is then withdrawn from the outer tube 1, and suitable valves are provided to break the vacuum which otherwise would be produced by pulling the filter tube from the outer tube, and inverted as shown in FIG. 3 to allow the filtered liquid to pass into the closed-end portion 3. The filter-head portion 3' is then broken off at the score line 6 as shown in FIG. 3 and the closed-end portion then utilized as a test tube for further processing the filtered liquid. To further this use an annular flange 7' is provided intermediate the closed end 7 and score line 6 so that the tube can be supported in a carousel or other testing apparatus (not shown).

The filter head comprises a cylindrical plug 10 adapted to be inserted in the open end of the tube 3' in frictional engagement therewith as shown in FIG. 8. The plug 10 has an annular flange 16 which projects beyond the bottom of the tube 3' and has a diameter equal to the inside diameter of the outer tube 1. It also may have small annular flanges 18 to enhance the frictional engagement of the plug in the tube 3'. The plug has an axial bore defining annular side walls 15 and a top wall 12. The axial bore is adapted to receive a cylindrical plug 11 of filter material and is provided with one or more slit perforations 13 through which liquid passing through the filter material 11 may pass through the top wall 12 into the filter-head portion 3'.

The plug 10 is made of elastomeric material and the slit perforations 13, which are shown enlarged for the purpose of illustration, are normally closed but open when pressure is exerted thereon from the bottom and closed when pressure is exerted thereon from the top. The slit perforations 13 are located near the side of the plug and form chords across the axial bore. Angular portions of the side wall 15 slope upwardly at 14 to meet those chords to provide substantial side support against the less substantial top portion 12, thereby insuring effective closure of the slit perforations 13 against pressure from above.

The flange 16 has slot perforations 17 extending from the bottom to the top thereof with the top portion of the slots located below the bottom of the tube 3' as shown in FIG. 8. When the filter tube is pushed into the outer tube 1, the flange 16 is pushed up into firm engagement with the bottom of the tube 3', thus sealing off the slot perforations 17. When, however, the filter tube is withdrawn, the flange 16 is peeled down away from the bottom of the tube 3' by frictional engagement with the inner walls of the outer tube 1, thus leaving the slot aperture 17 open for the passage of air therethrough into the bottom portion of the outer tube. This breaks any vacuum which otherwise would have occurred and permits easy withdrawal of the filter tube.

In the modification shown in FIGS. 4 and 5, the filter-tube portion is elongated as shown at 8 and telescopes up into the closed-end portion 9 which has an annular shoulder 9' corresponding to the annular shoulder 7'. In this modification, the vent 5 is provided by the unsealed space between the tube 9 and the tube 8. The assembly may be held together by a frangible tape (not shown) or by a spot of frangible adhesive (not shown), provided the space between the two tubes is not completely sealed off or occluded. The assembly is withdrawn and inserted as shown in FIG. 5 and the filter-head portion 8 simply withdrawn from the closed-end portion 9, leaving the closed-end portion 9 with its annular shoulder 9' for transfer to suitable testing apparatus.

The annular shoulders 7' and 9' may be constructed of suitable elastomeric material and may be the same or different from that used in forming the plug 10. Suitable elastomers for this purpose include natural rubber, butyl rubber, polyurethanes, and the like. The shoulders or collars 7' and 9' may also be integral with respective tubes 7 and 9, e.g., they may be a bead, shoulder or collar in the glass or other kind of tube itself.

It is to be understood that the invention is not to be limited to the exact details of operation or structure shown and described as obvious modifications and equivalents will be apparent to one skilled in the art.

We claim:

1. In a pressure differential filtering device which comprises an outer tube adapted to hold a liquid to be filtered and an inner tube having a pressure differential filter head at the end thereof adapted to be inserted into the outer tube in contact with the liquid to be filtered and to engender a pressure thereon which causes the liquid to pass through the filter head into the inner tube, the point to which the liquid rises in said inner tube being designated herein as the normal liquid level, the combination in which the inner tube has a uniform diameter throughout its length, a filter-head portion adapted to receive the liquid which passes through the filter head into the inner tube and a closed-end portion at the opposite end of the tube from the filter head, said closed-end portion being a continuation of the filter-head portion and united therewith by means of a frangible seam, and an air vent for exiting air from said inner tube, said air vent being a small hole in the wall of said inner tube but located between the filter head and said frangible seam above the normal liquid level of said inner tube, said closed-end portion being separable from said filter-head portion by breakage of said frangible seam, whereby, when the inner tube containing filtered liquid is inverted, the filtered liquid flows into the closed-end portion and the filter-head portion can then be separated therefrom, leaving the closed-end portion to serve as a tube for the further processing of the filtered liquid.

2. A method for the handling of liquids which have to be filtered prior to further processing, which comprises forcing the liquid to be filtered through a filter head into a unitary tube having a filter-head portion and a closed-end portion and a uniform diameter throughout, venting air from said unitary tube through a small hole in the wall thereof located above the level liquid rises to in said tube, inverting the tube so that the filtered liquid collects in the closed-end portion, circumferentially scoring said unitary tube at a point between said vent and said closed end located above the level liquid reaches when the tube is inverted, breaking off and removing the filter-head portion from the closed-end portion containing the filtered liquid for the said further processing.

3. In a filter-head tube having a pressure differential filter head at an end thereof, designed to be used by insertion into an outer tube in contact with liquid contained therein and desired to be filtered, to engender a pressure thereon for causing the liquid to pass through the filter head into the inner tube, the point to which the liquid rises in said inner tube being designated herein as the normal liquid level, the combination in which said filter-head tube has a uniform diameter throughout its length, a filter-head portion adapted to receive liquid which passes through the filter head into the filter tube and a closed-end portion at the opposite end of the tube from the filter head, said closed-end portion being a continuation of the filter-head portion and united therewith by means of a frangible seam, and an air vent for exiting air from said tube, said air vent being a small hole in the wall of said tube located between the filter head and said frangible seam but above the normal liquid level of said tube, said closed-end portion being separable from said filter-head portion by breakage of said frangible seam, whereby, when the filter-head tube containing filtered liquid is inverted, the filtered liquid flows into the closed-end portion and the filter-head portion can then be separated therefrom, leaving the closed-end portion to serve as a tube for further processing of filtered liquid.

4. The device of claim 3, in which the closed-end portion has an annular collar intermediate its length adapted to support the closed-end portion.

5. In a filter head tube having a pressure differential filter head at an end thereof, designed to be used by insertion into an outer tube in contact with liquid contained therein and desired to be filtered, to engender a pressure thereon for causing the liquid to pass through the filter head into the inner tube, the point to which the liquid rises in said inner tube being designated herein as the normal liquid level, the combination in which said filter head tube has a filter-head portion adapted to receive liquid which passes through the filter head into the filter tube and a closed-end portion at the opposite end of the tube from the filter head, one-way valve means which permits flow into the tube but not from the tube to the outside, and an air vent for exiting air from said tube located between the filter head and the closed end above the normal liquid level of said tube, said closed-end portion being separable from said filter-head portion, whereby, when the filter head tube containing filtered liquid is inverted, the filtered liquid flows into the closed-end portion and the filter-head portion can then be separated therefrom, leaving the closed-end portion to serve as a tube for further processing of filtered liquid, in which the filter head has one-way valve means between the tube and the outside which is adapted to admit air into an outer tube when said filter-head tube is used in conjunction with an outer tube and is withdrawn from said outer tube, and in which the filter head has an annular flange and an axial bore with at least one slot perforation in the annular flange which is sealed off by the bottom of the tube when the filter head is being inserted into said outer tube and which is not sealed off by the bottom of the tube when the filter head is being withdrawn from said outer tube, and with at least one slit perforation from the top into the axial bore which is normally sealed but which opens when pressure is applied from below.

* * * * *